United States Patent

[11] 3,598,244

| [72] | Inventor | Richard E. Babcock, Jr.<br>Waterloo, Va. |
|---|---|---|
| [21] | Appl. No. | 866,300 |
| [22] | Filed | Oct. 14, 1969 |
| [45] | Patented | Aug. 10, 1971 |
| [73] | Assignee | Komline-Sanderson Engineering<br>Corporation<br>Peapack, N.J. |

[54] FILTER BELT ALIGNING
7 Claims, 2 Drawing Figs.

| [52] | U.S. Cl. | 210/401 |
|---|---|---|
| [51] | Int. Cl. | B01d 33/04 |
| [50] | Field of Search | 210/400,<br>401, 402, 403, 404 |

[56] References Cited
UNITED STATES PATENTS
3,429,447  2/1969  Daws.............................  210/401

*Primary Examiner*—Reuben Friedman
*Assistant Examiner*—T. A. Granger
*Attorney*—Watson, Cole, Grindle & Watson ABSTRACT: A porous flexible filter media in the form of an endless belt, having beads along and coextensive with its opposite side edges is guided in an endless circuit around various rollers rotating about horizontal axes and including a filter drum and a discharge roll spaced from the drum. For tensioning the media transversely to its movement and for maintaining it centered axially with respect to the drum, a pair of weights are suspended normally at a common level partially immersed in a body of liquid, being supported by cables guided over pulleys or sheaves and connected to the opposite side edges of the filter media by suitable guides respectively mounted in alignment with each other for horizontal movement transverse to the movement of the filter media through its circuit.

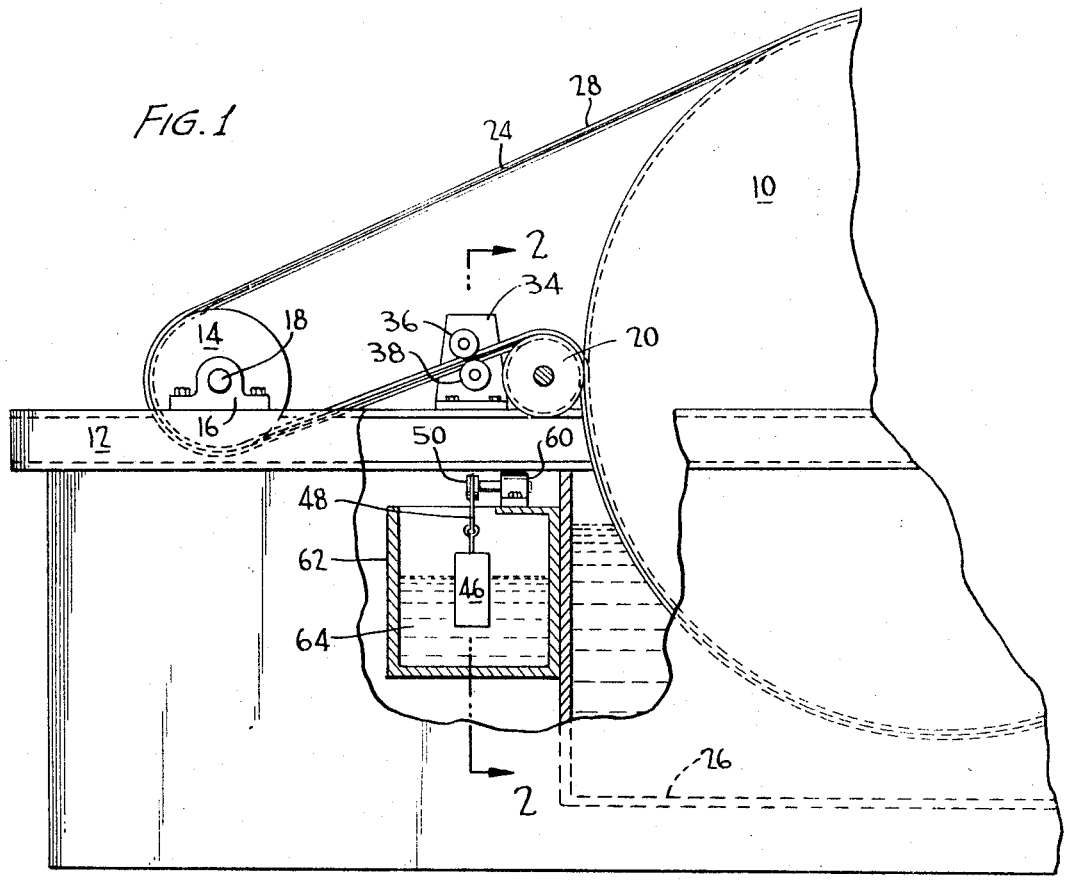
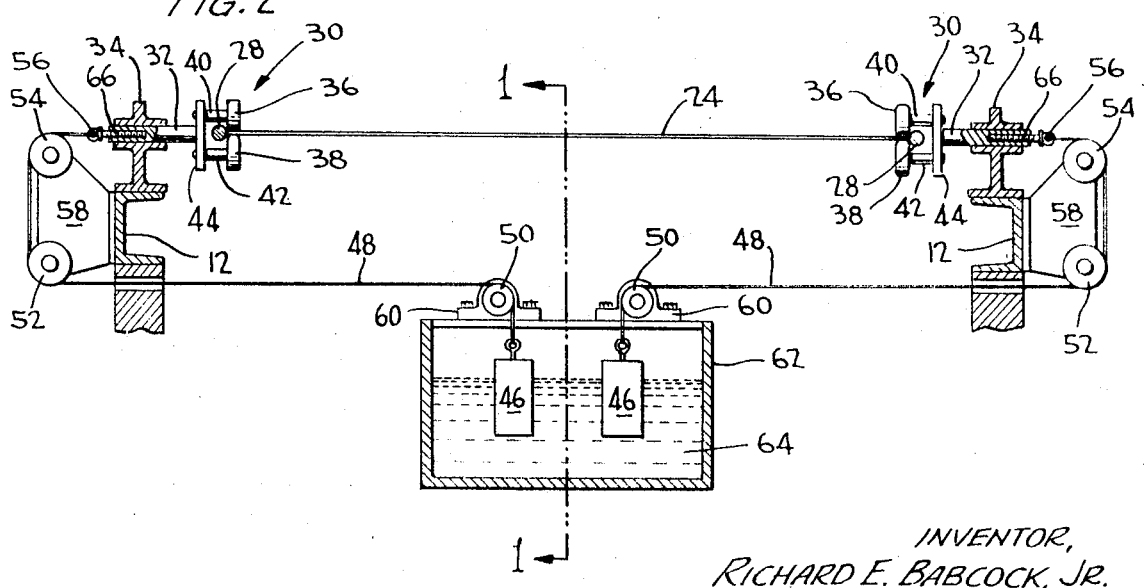

FILTER BELT ALIGNING

This invention relates to improved means for centering and tensioning the filter media of a belt discharge type of rotary vacuum filter unit. In general, the invention constitutes an improvement over filter belt tensioning and centering means such as disclosed in the U.S. patents to Peterson U.S. Pat. No. 3,077,990 of Feb. 19, 1963 and to Daugherty et al., U.S. Pat. No. 3,288,298 of Nov. 29, 1966.

It has long been known to transversely tension the filter media by means of weights supported by cables connected to the movable guides of the opposite beaded edges of the filter media, the weights being guided over sheaves in a manner to apply relatively horizontally opposed and balancing forces to the filter web or media. While this has been useful in eliminating wrinkles from the filter media, the weights as thus employed have applied balanced forces to the filter media even where the latter is displaced axially from a centered position on the drum, and thus have been incapable of centering the filter media with respect to the drum.

With this in mind, it is the primary object of the present invention to utilize weights in a manner to enable them to achieve the dual functions of both tensioning and centering the filter media.

To this end, in accordance with the present invention, the weights are suspended in semisubmerged relation in a body or bodies of liquid, so as normally to be equally submerged at equal levels with respect to the surface of the liquid and in balanced relation with respect to each other, when the filter media is in its properly centered position. They become relatively unbalanced when the filter media is laterally displaced, thereby causing equal but opposite vertical movement of the weights with respect to the liquid whereby a portion of the downward pull of one such weight is diminished by being increasingly offset by the buoyant action of the liquid as the weight descends into it, while the downward pull exerted by the other or upwardly moving weight is constantly increased as the latter is withdrawn upwardly from the liquid, thereby reducing the buoyant force or action of the liquid on that weight.

It will suffice for the purposes of the invention to connect the respective weights to the opposite edges of the filter media by any suitable means in which the downward pull of the weights is translated to relatively opposed horizontal or lateral forces acting on the opposite side edges of the filter media, though for purposes of illustration, a generally conventional arrangement has been shown.

The preferred embodiment of the invention is illustrated in the accompanying drawing, in which:

FIG. 1 is a generally diagrammatic view, partly in elevation and partly in section, on the line 1-1 of FIG. 2 of a conventional belt discharge rotary drum type filter unit, a portion only of which is shown.

FIG. 2 is a section on the line 2-2 of FIG. 1, this view also being of a diagrammatic nature and showing the details of the centering and tensioning mechanism as employed in the preferred embodiment.

Referring now in detail to the accompanying drawing, and first considering the general filter structure as illustrated in FIG. 1, it will be seen that the filter unit comprises a rotary filter drum 10 rotatably supported about a horizontal axis on a frame generally designated 12 and rotatably driven in any suitable manner in a counterclockwise direction as seen in FIG. 1. A conventional discharge roll 14 is mounted for rotation in bearings 16 on the frame 12 for rotation about a horizontal axis 18, in substantially spaced relation to the drum 10. Also, rotatably supported on the frame 12 and in substantial tangential relation with with the drum 10 is the conventional return roll 20.

The filter media 24 in the form of an endless porous and flexible belt is driven through an endless circuit around the drum 10 and rolls 14 and 22. It will be noted that the arrangement is the conventional one wherein the belt or media 24 has a discharge portion moving off of the drum and around the discharge roll 14, at which location the filter cake formed on the belt or media is discharged to be received on and carried away by suitable conveyor means constituting no part of the invention and, therefor, not illustrated. After passing around the discharge roll 14, the discharge portion of the filter media is led over the return roll 20 which guides it accurately back on to the drum 10. In passing around the drum 10 during the rotation of the latter, the belt or media 24, together with the lower peripheral portion of the drum 10 is immersed in a mixture of solids and liquids to be filtered, such mixture being held within the conventional tank 26 of the filter unit.

It will be appreciated that after passing around the discharge roll and before being returned back on to the drum, the filter media will normally be subjected to various washing and cleaning operations by conventional mechanism not herein illustrated.

In accordance with conventional practice, the peripheral surface of the filter drum 10, around which the filter media is guided, is provided with multiple perforations (not shown) which communicate with a vacuum source during operation of the unit to draw liquid through the filter media and into the interior of the drum, while depositing the solids on the filter media in the form of a filter cake to be discharged during passage of the filter media around the discharge roll 14. In order to avoid leaving any axial portion of the filter drum periphery uncovered by the filter media 24, it is desirable to have some means for accurately centering the filter media in an axial direction on the drum as well as for tensioning or stretching the filter media 24 transversely to its path of travel or, in other words, in a direction parallel to the rotational axis of the drum 10.

For the use in thus aligning the filter media, the latter may be provided with conventional beads 28 along and coextensive with its opposite side edges, as illustrated diagrammatically in FIG. 2. These beads, in turn, are slidably disposed through suitable guides 30 which are disposed on opposite sides and outwardly of the edges of the filter media 24 and supported for generally horizontal movement in substantial alignment with each other, as by means of rodlike shanks 32, respectively, slidably disposed through bearings 34 affixed to the frame 12 of the filter unit. The guides 30 may be constructed in any suitable manner to enable them to permit relatively free or unobstructed movement of the filter media 24 through its endless circuit, while bearing outwardly against the edge beads 28 to exert a transverse tensioning action on the filter media 24.

In the form shown, the guides 30 are of generally conventional construction, each comprising a pair of peripherally opposed rollers 36 and 38 rotatably mounted on shafts 40 and 42, respectively, affixed to a bracket 44 which, in turn, is carried at the inner end of the shank 32.

For achieving the centering and tensioning functions, weights 46-46 are connected to the guides 30-30 by means of flexible cables 48 which are guided around suitably located pulley wheels or sheaves 50, 52 and 54, extending from the last-mentioned sheave 54 in alignment with the shanks 32 of the respective guides 30 and connected to the shanks by means of suitable anchors or eyelets 56 at the ends of the respective shanks 32. The cables 48 thus exemplify a suitable means for connecting the weights 46, respectively, through the guides 30 to the filter media, to translate lateral displacement of the filter media 24 into equal and opposite vertical movement of the bodies or weights 46-46 and vice versa.

In the embodiment shown, the pulley wheels or sheaves 52 and 54 are rotatably mounted on a common bracket 58 affixed to the frame 12 of the filter unit, while the sheaves 50 both have their shafts rotatably supported in bearings 60 affixed to the tank 62 which, in turn, is suitably supported from the frame 12.

The tank or tank means 62 contains a supply of liquid 64 and the lengths of the cables are such that when the filter media 24 is accurately centered along the axis of the filter drum 10, the respective weights 46 will be suspended at a common level in which they will be semisubmerged within the liquid 64, the arrangement preferably being such that the liquid surface will be located approximately midway of the height of the respective weights.

In order to permit an adjustment of the effective lengths of the respective cables to facilitate positioning of the weights 46 at such common level, there may be provided suitable adjusting means, here exemplified by screws 66 threaded into the shanks 32 of guides 30 and supporting at their outer ends the eyelets 56 to which the cables 48 are connected. Thus by rotation of the eyelets and screws, a precise adjustment of the effective length of each cable 48 may be attained.

In the form shown, the weights 46 are of uniform or identical cylindrical shape, size and specific gravity, their specific gravity being approximately equal to that of the liquid 64 in which they are semisubmerged.

Thus in the operation of the invention, as long as the filter media 24 is accurately centered with respect to the filter drum 10, the weights 46 will be suspended at a common level in the liquid 64, the buoyant effect or force of the liquid opposing and in effectcancelling a portion of the downward pull of gravity on the respective weights 46. However, the weights are suspended at such a height with respect to the surface of the liquid 64, that a substantial portion of the gravitational pull on each weight is applied to tensioning the filter media 24 transversely to its path of travel. As long as the filter media remains centered with respect to the filter drum, the opposing horizontal forces transmitted from the weights 46 to the opposite side edges of the media 24, will balance and neutralize each other.

However, referring to FIG. 2, if the filter media 24 becomes displaced toward the left as seen in that Figure, the left-hand weight 46 will be moved downwardly to a lower level in the liquid 64, while the right-hand weight 46 will be raised or moved vertically to an equal but opposite extent, it being apparent that the cables 48 and their associated sheaves exemplify a means for translating lateral displacement of the media 24 into equal and opposite vertical movement of the weights 46.

Lowering of the left-hand weight 46 with the resulting displacement of additional liquid 64, will progressively decrease the pull to the left on the filter media through the left-hand cable 48, while at the same time, the resulting upward displacement of the right-hand weight 46 will cause a greater proportion of its downward pull or weight applied against the right-hand edge of the filter media 24. The unbalanced relationship of the horizontally applied opposing forces thus will tend to urge the filter media 24 to the right until the latter reassumes its centered position in which the weights 46 assume a common level and the forces transmitted from them to the opposite edges of the filter media are again in balanced relation.

For convenience of illustration, the two weights 46 are both shown as immersed in a common body of liquid, though it should be appreciated that the use of separate bodies of liquids for the respective weights is by no means precluded, so long as the weights are equally immersed in the liquid when the filter media is properly centered.

Having thus described my invention, I claim:

1. In a filter unit comprising a suction drum rotating about a horizontal axis, a discharge roll spaced radially from said drum and a flexible porous filter media moving in an endless circuit around said drum and said discharge roll, said filter media normally being axially centered on the drum, the improvement comprising mechanism for centering said media axially with respect to said drum and for tensioning said media transversely to its movement through said endless circuit, said mechanism comprising tank means having liquid therein, a pair of weights of similar dimensions and specific gravity, means connecting said weights respectively to said media to translate axial movement of said media from its centered relation with respect to the drum into equal and opposite vertical movement of said weights and vice versa, said weights normally being partially but not wholly immersed at equal depths in said liquid so as to be subjected equally to buoyant forces less than the gravitational forces thereon, whereby normally to apply balanced and opposed transverse tensioning forces to said media when said media is centered with respect to the drum, axial displacement of said media from its centered position and resulting vertical displacement of said weights, unbalancing said tensioning forces to apply resultant force to said media in a direction to restore it to its centered position.

2. The improvement defined in claim 1, wherein said filter media includes beads extending along and coextensive with its opposite side edges, said mechanism for centering and tensioning the filter media including guides supported on opposite sides of the media for movement in horizontal alignment with each other transversely to the movement of said media through its endless circuit, said beads being operatively disposed in and freely movable longitudinally through said respective guides, said weights being operatively connected to the respective guides to urge the guides horizontally apart.

3. The improvement of claim 2 in which each said guide comprises a horizontally disposed shank, bearing means slidably receiving and guiding said shank for horizontal movement transversely to the movement of said media, and a pair of rollers rotatably supported from said shank on opposite sides of the media and each in peripheral engagement with one of said edge beads.

4. The improvement of claim 2 including sheaves rotatably supported in substantial horizontal alignment with said respective shanks, flexible tension means trained over said respective sheaves and connected to said shanks, said weights being suspended in partially submerged relation in the liquid from the flexible tension means.

5. The improvement of claim 1 in which both said weights are semisubmerged in a common body of liquid.

6. The improvement of claim 2, including a flexible cable connecting each said weight to one of said guides means guiding said cables for movement horizontally outwardly from the respective guides, said weights being suspended from the ends of the cables remote from said guides.

7. The improvement of claim 2, wherein said tank means is a single tank centered between said guides at a level below said media, said liquid consisting of a single body of liquid, a flexible cable connecting each weight to one of said guides, means guiding said cables for movement in the direction of their lengths horizontally outwardly from the respective guides, thence downwardly and inwardly beneath said media to locations above said tank, thence downwardly to suspend the said bodies in said tank.